(12) United States Patent
Silverman et al.

(10) Patent No.: US 8,271,325 B2
(45) Date of Patent: Sep. 18, 2012

(54) ADJUSTING BIDS BASED ON PREDICTED PERFORMANCE

(75) Inventors: Andrew E. Silverman, San Francisco, CA (US); Abhinay Sharma, Mountain View, CA (US); James A. Gallagher, Mountain View, CA (US); Tomas Lloret Llinares, Mountain View, CA (US); Scott S. Benson, Santa Clara, CA (US); Karl Robert Pfleger, San Francisco, CA (US); Adrian Dumitru Corduneanu, Mississauga (CA)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 12/627,196

(22) Filed: Nov. 30, 2009

(65) Prior Publication Data

US 2010/0138291 A1   Jun. 3, 2010

Related U.S. Application Data

(60) Provisional application No. 61/119,192, filed on Dec. 2, 2008.

(51) Int. Cl.
*G06Q 30/00* (2006.01)

(52) U.S. Cl. ...................................... 705/14.1

(58) Field of Classification Search .................. 705/14.1
See application file for complete search history.

(56) References Cited

U.S. PATENT DOCUMENTS

| 2006/0248035 | A1  | 11/2006 | Gendler et al. |
| 2007/0067215 | A1* | 3/2007  | Agarwal et al. ................. 705/14 |
| 2008/0103892 | A1  | 5/2008  | Chatwin et al. |
| 2008/0249832 | A1  | 10/2008 | Richardson et al. |

FOREIGN PATENT DOCUMENTS

| KR | 10-2003-0069128 | 8/2003 |
| KR | 10-2005-0100336 | 10/2005 |

OTHER PUBLICATIONS

Notification Concerning Transmittal of International Preliminary Report on Patentability for PCT/US2009/066196 dated Jan. 16, 2011, 6 pages.

* cited by examiner

*Primary Examiner* — Daniel Lastra
(74) *Attorney, Agent, or Firm* — Fish & Richardson P.C.

(57) ABSTRACT

A predicted performance metric of a candidate advertisement in an advertising slot can be received and compared to a baseline predicted performance metric for the candidate advertisement. A target bid associated with the candidate advertisement can be adjusted based upon the comparison, and the adjusted bid can be submitted to an auction for the advertising slot.

16 Claims, 4 Drawing Sheets

ADJUSTING BIDS BASED ON PREDICTED PERFORMANCE

CROSS-REFERENCED TO RELATED APPLICATIONS

This application claims the benefit under 35 U.S.C. §119 (e) of U.S. Patent Application No. 61/119,192, titled "ADJUSTING BIDS BASED ON PREDICTED PERFORMANCE" filed Dec. 2, 2008, which is incorporated herein by reference.

TECHNICAL FIELD

The subject matter of this application is generally related to online advertising.

BACKGROUND

The rise of the Internet has enabled access to a wide variety of content items, e.g., video and/or audio files, web pages for particular subjects, news articles, etc. Such access to these content items has likewise enabled opportunities for targeted advertising. For example, content items of particular interest to a user can be identified by a search engine in response to a user query. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. Because the users are likely interested in the particular content on the publisher webpage, they are also likely to be interested in the product or service featured in the advertisement. Accordingly, such targeted advertisement placement can help drive online customers to the advertiser's website.

Advertisers can bid for placements based upon how much the advertiser values the placement. In some examples, the advertiser can bid based upon impressions of the advertisement. In such examples, the advertiser is charged whenever the advertisement is served. In other examples, the advertise can bid based upon a click-through for the advertisement. In such examples, the advertiser is charged only when a user clicks on the advertisement after the advertisement is served to the user.

SUMMARY

In general, the subject matter of this application relates to adjusting target bids for advertisement in an auction. Methods for target bid adjustment can include: identifying a candidate advertisement, the candidate advertisement being a candidate for participating in an auction of a current advertising slot, the candidate advertisement being associated with an advertiser and a target bid; receiving a predicted performance metric for the advertisement in the current advertising slot; comparing the predicted performance metric for the advertisement in the current advertising slot to a baseline predicted performance metric of the candidate advertisement; adjusting the target bid associated with the advertisement based upon the comparison of the predicted performance metric and the baseline predicted performance metric; and submitting the adjusted target bid to the auction. Other embodiments of this aspect include corresponding methods, apparatus, and computer program products.

DESCRIPTION OF DRAWINGS

Like reference numbers and designations in the various drawings indicate like elements.

DETAILED DESCRIPTION

Bids for advertisements can be adjusted based upon a predicted performance of the advertisement in a current advertisement placement being auctioned relative to a baseline predicted performance of the advertisement over a set of past auctions or placements. The predicted performance, for example, can include a predicted conversion rate, a predicted click-through rate, or a predicted revenue or profit margin, among many others. The set of past auctions or placements, for example, can be selected based upon other auctions in which the advertisement was a candidate for participation in the auction, placements in which the advertisement received an impression, placements in which the advertisement received a click, or placements in which the advertisement received a conversion, among many others. The bid can be adjusted up or down depending upon the comparison between the predicted performance and the baseline predicted performance. The adjusted bid can be submitted to the impending auction for the current advertisement placement.

Advertising System Overview

Figure 1:
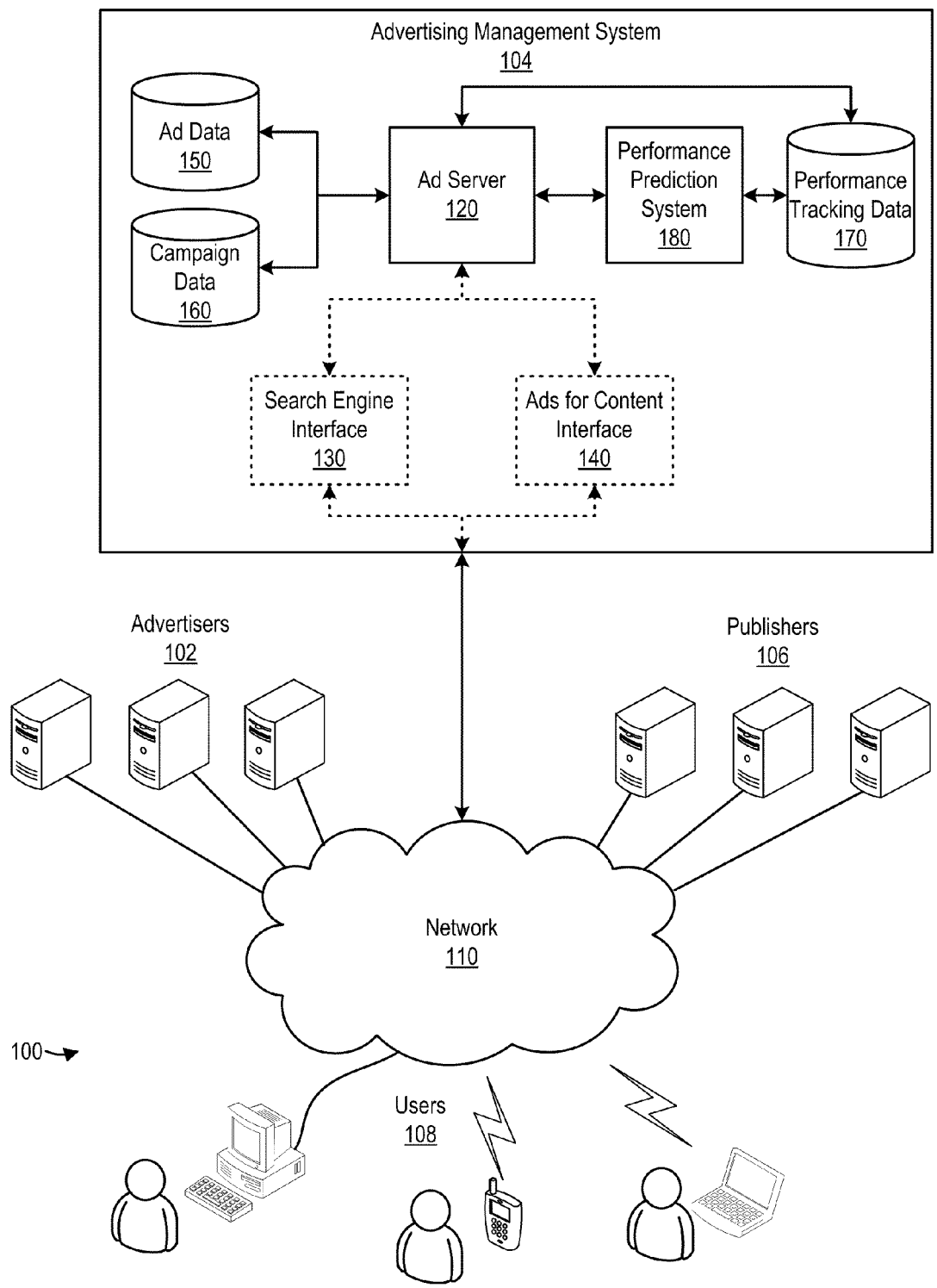
FIG. 1 is a block diagram of an implementation of an online advertising environment.

FIG. 1 is a block diagram of an implementation of an online advertising system 100. In some implementations, one or more advertisers 102 can directly, or indirectly, enter, maintain, and track advertisement ("ad") information in an advertising management system 104. The ads may be in the form of graphical ads, such as banner ads, text only ads, image ads, audio ads, video ads, ads combining one of more of any of such components, etc. The ads may also include embedded information, such as links, meta-information, and/or machine executable instructions. One or more publishers 106 may submit requests for ads to the system 104. The system 104 responds by sending ads to the requesting publisher 106 for placement on one or more of the publisher's web properties (e.g., websites and other network-distributed content).

Other entities, such as users 108 and the advertisers 102, can provide usage information to the system 104, such as, for example, whether or not a conversion or click-through related to an ad has occurred. This usage information can include measured or observed user behavior related to ads that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). The content server can transmit information about the ads back to the ad server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 104. This combined information can then forwarded to the user 108 that requested the content. The search results can be maintained as distinct from the ads, so as not to confuse the user between paid advertisements and presumably neutral search results.

Finally, the search service can transmit information about the ad and when, where, and/or how the ad was to be rendered back to the system 104.

As can be appreciated from the foregoing, the advertising management system 104 can serve publishers 106, such as content servers and search services. The system 104 permits serving of ads targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

Target Bid Adjustment

In some implementations, the system 104 includes an adjustable bidding system which predicts or estimates a performance metric for a given ad placement for an advertisement using performance prediction engine. In further implementations, the system 104 includes a bid adjustment system used to adjust bid associated with an advertisement and specified by the advertiser 102 to account for the potential that a current advertising slot provides a better opportunity for the advertiser 102 than other opportunities.

The advertising management system includes an ad server 120 operable to serve advertisements to publishers 106 through a search engine interface 130 or through an ads for content interface 140. Advertisements for the search engine interface 130 can be identified, for example, based upon the search terms entered by the user 108. Advertisements for the ads for content interface 140 can be identified, for example, based upon an analysis of the content of the publisher 106 web page and a comparison to keywords or concepts associated with the advertisements.

In some implementations, the advertising management system 104 can include an advertisement data store 150 and a campaign data store 160. Advertisements and associated usage data can be stored as advertisement data in an advertisement data store 150. In some implementations, an advertiser 102 can further manage the serving of advertisement by specifying an advertising campaign. The advertising campaign can be stored in campaign data in a campaign data store 160 that can, for example, specify advertising budgets for advertisements, when, where and under what conditions particular advertisements may be served for presentation, etc. For example, a computer company may design an advertising campaign for a new laptop computer that is scheduled to be released in several weeks. The advertising campaign may have a budget of $500,000, and may have 30 different advertisements that are to be served for presentation during the month of November. Such data defining the advertisement campaign can be stored in the campaign data 160.

In some implementations, the advertisement server 120 can be coupled to a performance tracking data store 170. The advertisement server 120 can send performance tracking data identifying how well the advertisement is performing to the performance tracking data store 170. Identification of how well the ad is performing can be based on a performance metric. The performance metric can be defined, for example, in terms of the number of times the advertisement has been served, the number of times the advertisement has been selected (e.g., a click-through rate), the number of conversions that have been recorded, the average profit or revenue associated with an impression or selection of the advertisement, survey information about the advertisement from those viewers that have received the advertisement, or predicted performance scores for each participation in an auction, among others.

A performance prediction system 180 can use the performance tracking data from the performance tracking data store 170 to predict performance of an advertisement in a given slot. The predicted performance information, for example, can be used by the ad server 120 to adjust a bid associated with an advertisement.

In some implementations, the ad server 120 can adjust the bid associated with an advertisement based upon comparing a predicted performance metric for the advertisement with a baseline predicted performance metric for the advertisement. In various examples, the predicted performance metric can be any of a selection of the advertisement (e.g., a click-through), a conversion (e.g., sale) associated with an impression, or revenue or profit generated as a result of the impression, among many others.

In some implementations, the baseline predicted performance metric can be identified by identifying a control set. The control set, for example, can be a set of previous action data for a set of auctions for which the advertisement was a candidate advertisement, a set of auctions for which the advertisement received an impression, a set of impressions which resulted in the advertisement being selected (e.g., clicked) by a user, a set of impressions which resulted in a conversion, etc. Upon identifying the control set, the ad server 120 can average predicted performance metrics for each of the auctions in the control set to identify the baseline predicted performance. For example, if the predicted performance metric is predicted conversion rate (pCVR), the baseline predicted performance metric can be identified as:

$$\text{Baseline predicted performance} = \frac{pCVR_1 + pCVR_2 + \ldots pCVR_N}{N}$$

Where $pCVR_n$ corresponds to the predicted conversion rate for the nth member of the control set, and N corresponds to the cardinality of the control set. Thus, for example, if the control set covers three auctions {A1, A2, A3}, the predicted performance metric is predicted conversion rate, and the pCVR for A1 is 30%, the pCVR for A2 is 5%, and the pCVR for A3 is 10%, the baseline predicted performance metric can be identified as 15% (($pCVR_{A1}+pCVR_{A2}+pCVR_{A3}$)/3=(30%+5%+10%)/3=15%). In those examples using a different predicted performance metric, the predicted conversion rate can be replaced by the appropriate predicted performance metric.

The ad server 120 can compare the predicted performance metric of a candidate advertisement for a current advertisement placement associated with an impending auction to the baseline predicted performance metric. Based upon the comparison, the ad server 120 can adjust the bid associated with the advertisement. In some implementations, the comparison can include dividing the predicted performance metric for the current placement by the baseline predicted performance metric. In such implementations, any error introduced by a performance prediction component is canceled out because the same error can be assumed to be present in both the predicted performance metric for advertisement in the current advertising slot and the baseline predicted performance metric for the advertisement. The result of dividing the predicted performance metric by the baseline predicted performance metric can identify an adjustment ratio. In those implementations using predicted conversion rates as the predicted performance metric, the adjustment ratio can be identified by the equation:

$$\text{Adjustment Ratio} = \frac{pCVR_{current}}{pCVR_{baseline}}$$

Where $pCVR_{current}$ is the predicted conversion rate for the current advertising slot, and $pCVR_{baseline}$ is the an average predicted conversion rate for the advertisement over a control set. For example, if predicted conversion rate for a current advertising slot is 15% and a baseline predicted conversion rate for the current advertising slot is 10%, the adjustment ratio can be identified as 15%/10%, or 1.5. The adjustment ratio can be used to adjust the bid associated with the candidate advertisement. In some implementations, the bid can be multiplied by the adjustment ratio to derive an adjusted bid, which can be submitted to the impending auction.

In some implementations, the baseline predicted performance metric can be continuously updated. In such implementations, the ad server 120 can serve a portion of the requests (e.g., 5%, 15%, 25%, 50%, etc.) for which an advertisement qualifies as a candidate advertisement without adjusting the bid. The portion of the requests which are served without adjusting the bid can be identified as the control set.

In some implementations, the portion of requests allocated to the control set can be dynamically adjusted. For example, when an advertisement is new and there does not exist enough tracking data to provide an adequate sampling for the control set, the ad server 120 can allocate an increased percentage of traffic (e.g., 50%) to the control set. After a predetermined period of time, for example, or number of impressions (or other metric), the percentage of traffic allocated to the control set can be reduced by the ad server 120. In another example, if an advertisement does not accumulate enough tracking data, the percentage of traffic allocated to the control group can remain high.

In some implementations, the control set can be replaced by a sliding window identifying a specified number of previous auctions preceding the current auction. Thus, a specified number of previous auctions can be used to update the baseline predicted performance metric.

In some implementations, if an average price paid by the advertiser 102 exceeds the target bid specified by the advertiser 102, the ad server 120 can throttle the adjustment of the target bid. In other implementations, if the average price paid by the advertiser 102 exceeds the target bid by a threshold amount, the ad server 120 can throttle the adjustment of the target bid. Throttling the adjustment of the target bid can reduce the average price paid by the advertiser 102 for a placement, click-through, conversion, etc. to the target bid.

In some implementations, throttling of the adjustment to the target bid can be done based upon an amount by which the average price paid exceeds the target bid. For example, if an average price paid exceeds a target bid by 20%, the adjusted bid can be discounted by 20%. Thus, for example, if a target bid specified by the advertiser is $1.00 on a CPC basis, and an adjustment ratio is identified as 1.2, the adjusted bid of $1.20 can be discounted by 20% to $0.96 (e.g., Throttled Bid=Adjusted Bid*(1−Discount Percentage)=$1.20*(1−0.20)=$0.96).

In other implementations, throttling of the adjusted target bid can be done by identifying a maximum adjusted bid above which the target bid cannot be adjusted. In some examples, the maximum adjusted bid can be set based upon the target bid. For example, the target bid may be raised by a percentage (e.g., 20%) to identify the maximum adjusted bid. In other examples, the maximum adjusted bid may be the target bid itself.

In other implementations, throttling of the adjusted bid can be accomplished by allocating a larger portion of the requests for the candidate advertisement to the control set. Allocation of a larger portion of the bids to the control set can provide a maximum bid as the target bid for a larger percentage of the auctions for which the advertisement is a candidate, and thereby lowering the average price paid for the advertisement.

Figure 2:
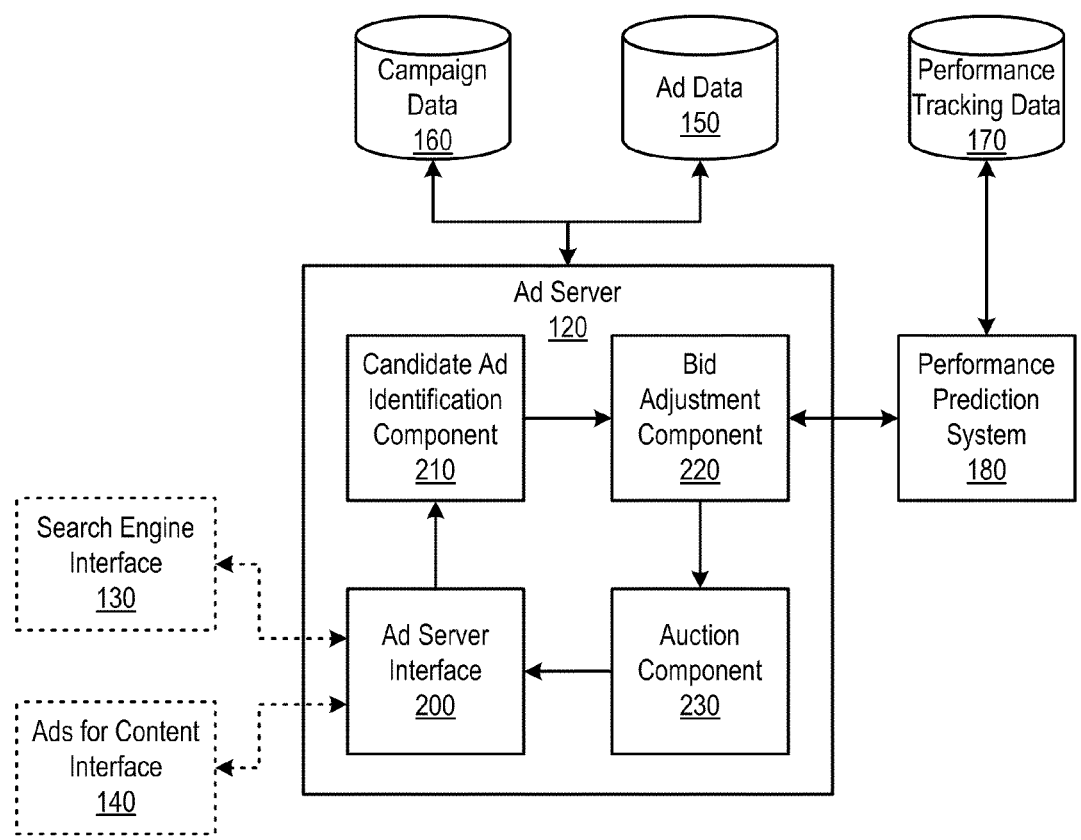
FIG. 2 is a block diagram of an example implementation of an advertisement server shown in FIG. 1.

FIG. 2 is a block diagram of an example implementation of an ad server 120 shown in FIG. 1. In some implementations, the ad server 120 can include an ad server interface 200, a candidate advertisement identification component 210, a bid adjustment component 220 and an auction component 230. The ad server interface 200 can receive advertisement requests from one or more of the search engine interface 130 or the ads for content interface 140. Receipt of an advertisement request signals an impending auction for a current advertisement slot on the requesting web page or search engine page. The impending auction can be based upon any auction paradigms including, for example, a cost per impression metric (e.g., cost per mille (CPM) or cost per action (e.g., cost per click (CPC), cost per conversion, etc.) paradigm. The auction paradigm can be based upon publisher preference or by an ad exchange on which the ad slot is auctioned.

Upon receiving a request for an advertisement, the candidate advertisement identification component 210 can identify a candidate advertisement for the request. The candidate advertisement can be identified, for example, based upon search terms included in a search query or based upon content of a requesting web page. In some implementations, candidate advertisements can also be identified based upon preferences of publishers for types of advertisements or preferences of advertisers for types of slots. The candidate advertisement identification component 210 can retrieve advertisement information from the ad data store 150 and/or campaign information from the campaign data store 160 in order to facilitate identification of candidate advertisements.

For those candidate advertisements identified by the candidate advertisement identification component 210 that have enabled adjustment of an associated target bid, a bid adjustment component 220 can adjust the target bid based upon information from the performance prediction system 180. In some implementations, enablement of target bid adjustment can be based upon an advertiser enabling performance tracking. In other implementations, enablement of target bid adjustment can be based upon explicit instruction from the advertiser to enable target bid adjustment (e.g., based upon input received through an advertiser interface to the ad server 120).

In some implementations, bid adjustment can be based upon comparison of a predicted performance metric (e.g., predicted click-through rate, predicted conversion rate, predicted revenue, predicted profit margin, etc.) to a baseline predicted performance metric. For example, in a cost per click auction model, the predicted conversion rate for the advertisement in the slot being auctioned can be compared to a baseline predicted conversion rate for the advertisement across a sampling of auctions. The sampling of auctions can be identified, for example, by allocating a portion of auctions for which the advertisement is a candidate advertisement to a control set. Alternatively, the control set can be limited to those auctions where the candidate advertisement registered an impression, a click-through, a conversion, or any other measurable action. The baseline predicted performance metric can be an average of the predicted performance metrics for each of the auctions/placements identified by the control set.

In some implementations, the comparison of the predicted performance metric for the current advertisement placement with the baseline predicted performance metric can include dividing the predicted performance metric for the current advertisement placement by the baseline predicted performance metric. For example, if the average predicted conversion rate for the candidate advertisement in the auctions/placements in the control group is 10% and the predicted conversion rate for the candidate advertisement in the impending auction/current placement is 5%, an adjustment ratio of 1/2 can be identified (e.g., 5%/10%). A bid associated with the candidate advertisement can thereby be scaled by the adjustment ratio. Thus, if the target bid for the candidate advertisement is $1.00 on CPC basis, the adjusted bid is the target bid multiplied by the adjustment ratio, or $0.50 on a CPC basis (e.g., $1.00×1/2).

In some implementations, the bid adjustment component 220 can throttle the adjusted bid based upon an average price paid exceeding the target bid or an average price paid exceeding the target bid by a threshold margin. For example, if the target bid is $1.00, and the average price paid is $1.35, future adjusted bids can be modified to reduce the average price paid toward the target bid. In some implementations, throttling of the adjusted bid can reduce the average price paid while maintaining a bias for the advertisement towards placements in which the bid is expected to be more successful (e.g., based upon the comparison the predicted performance metric to the baseline predicted performance metric).

Bid Adjustment Process

Figure 3:
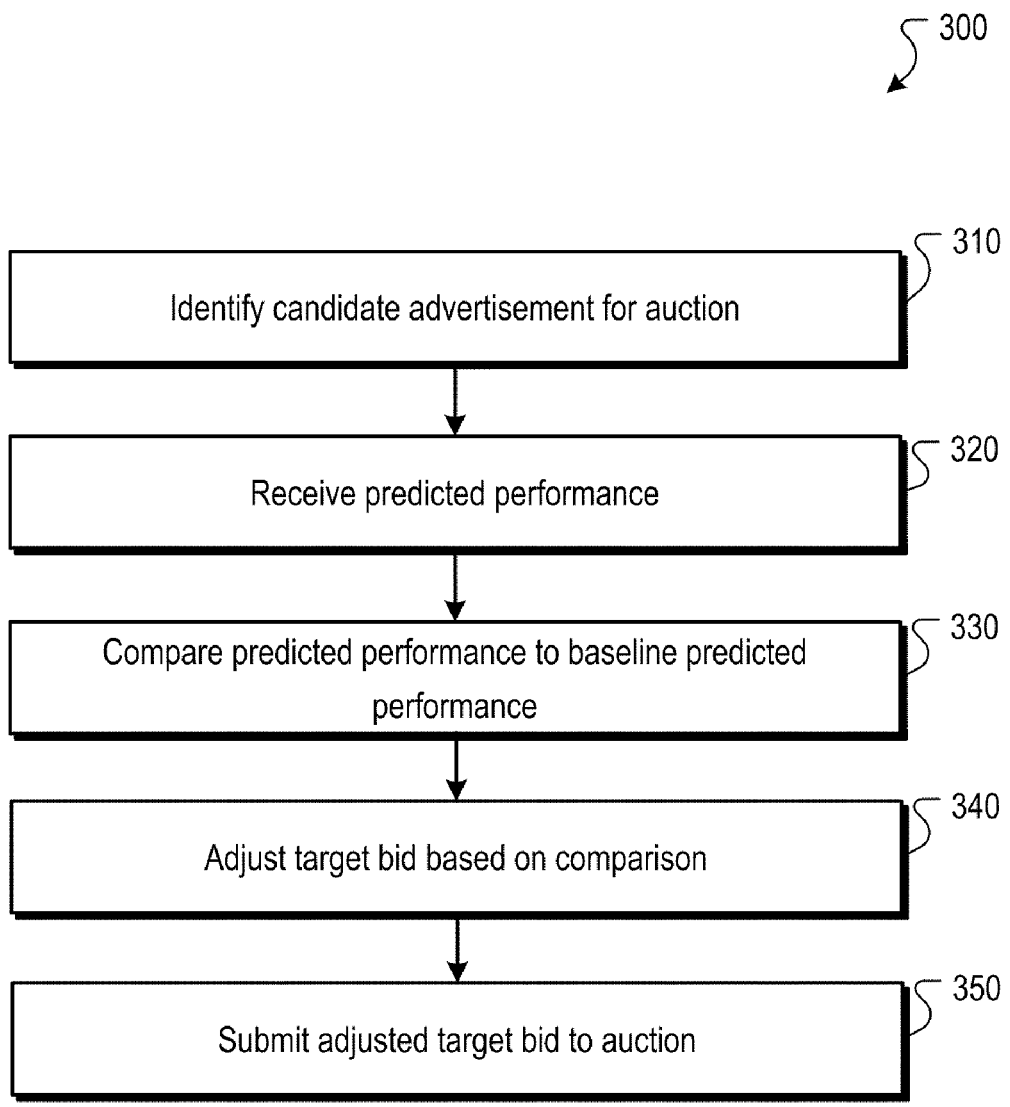
FIG. 3 is a flow diagram of an implementation of a bid adjustment process.

FIG. 3 is a flow diagram of an implementation of a bid adjustment process. At stage 310 candidate advertisements can be identified for the auction. Candidate advertisements can be identified, for example, by a candidate advertisement identification component (e.g., candidate advertisement identification component 210 of FIG. 2). In some implementations, candidate advertisements can be identified based upon search terms received from a search engine. In other implementations, candidate advertisements can be identified based upon analysis of the content of a web page requesting the advertisement. The analysis of the web page can occur in real-time or offline when the publisher engages an ad server to supply future advertisements for the publisher. In examples where the analysis of a web page occurs offline, the ad server can supply a snippet to the publisher for insertion into the web page. The snippets upon execution by a browser can cause the browser to send a request for an advertisement along with an identification, identifying the web page. The ad server can use the identification to retrieve the previous analysis of the web page. Candidate advertisements can then be selected based upon the retrieved web page analysis. In some implementations, candidate advertisements can be further identified based preferences of the publisher and/or advertiser.

At stage 320, a predicted performance is received. The predicted performance can be received, for example, by a bid adjustment component (e.g., bid adjustment component 220 of FIG. 2) from a performance prediction system (e.g., performance prediction system 180 of FIGS. 1 and 2). The performance of the advertisement is predicted with respect to the current placement (e.g., the placement for which the ad server received an advertisement request). In some implementations, the predicted performance of the advertisement can be based upon past performance of the advertisement in similar slots (e.g., on the same web page, for the same search query, at the same time of day, for similar users, for similar content or concepts, etc.).

At stage 330, the received predicted performance is compared to a baseline predicted performance. The received predicted performance can be compared to the baseline predicted performance, for example, by a bid adjustment component (e.g., bid adjustment component 220 of FIG. 2). In some implementations, the baseline predicted performance can be compiled from a control set of placements for which the same advertisement was a candidate. The control set of placements, in some examples, can be identified as a portion of placements for which the advertisement is a candidate advertisement which do not adjust the target bid. In various examples, the control set can be limited to those placements that did not use an adjusted target bid and which registered a click-through, conversion or other activity with respect to the advertisement. In some implementations, the comparison of the predicted performance to the baseline predicted performance can include dividing the predicted performance by the baseline predicted performance to derive an adjustment ratio. Other forms of comparison and or adjustment can be used, including, for example, logarithmic functions. Logarithmic functions can provide an asymptotic relationship between the adjusted bid and the target bid, thereby inhibiting the adjustment of the target bid beyond the asymptote specified by the function.

At stage 340, a target bid can be adjusted. The target bid can be adjusted, for example, by a bid adjustment component (e.g., bid adjustment component 220 of FIG. 2). In those implementations that derive an adjustment ratio, the adjustment ratio can be used to adjust the target bid specified by the advertiser. For example, the adjustment ratio can be multiplied by the target bid to identify an adjusted bid. In some implementations, when an average price paid by the advertiser for placements of the advertisement exceeds the target bid or is at a threshold above the target bid, the adjusted bid can be throttled to reduce the average price paid by the advertiser for placement of the advertisement. In such implementations, the bid adjustment system can continue to bias the placements in favor of more favorable placements by applying a discount to all adjusted bids, rather than only those adjusted bids which exceed the target bid, or some other mechanism.

At stage 350, the adjusted bid is submitted to an auction. The adjusted bid can be submitted to an auction, for example, by a bid adjustment component (e.g., bid adjustment component 220 of FIG. 2) in conjunction with an auction component (e.g., auction component 230 of FIG. 2). In some implementations, the auction component can determine whether or not the advertisement qualifies for placement based upon the adjusted bid. If an advertisement qualifies for placement, the advertisement can be communicated to the publisher or search engine through an ad server interface.

In some implementations, the predicted performance metric can be replaced by past performance. For example, if tracking data indicates that an advertisement, on average, has a conversion rate of 5%, the baseline predicted performance metric can be identified as 5%. Similarly, if the tracking data indicates that the advertisement has previously had an 8% conversion rate in this particular slot (or in similar slots on similar properties), an adjustment ratio of 1.6 can be derived.

Example Computer System

Figure 4:
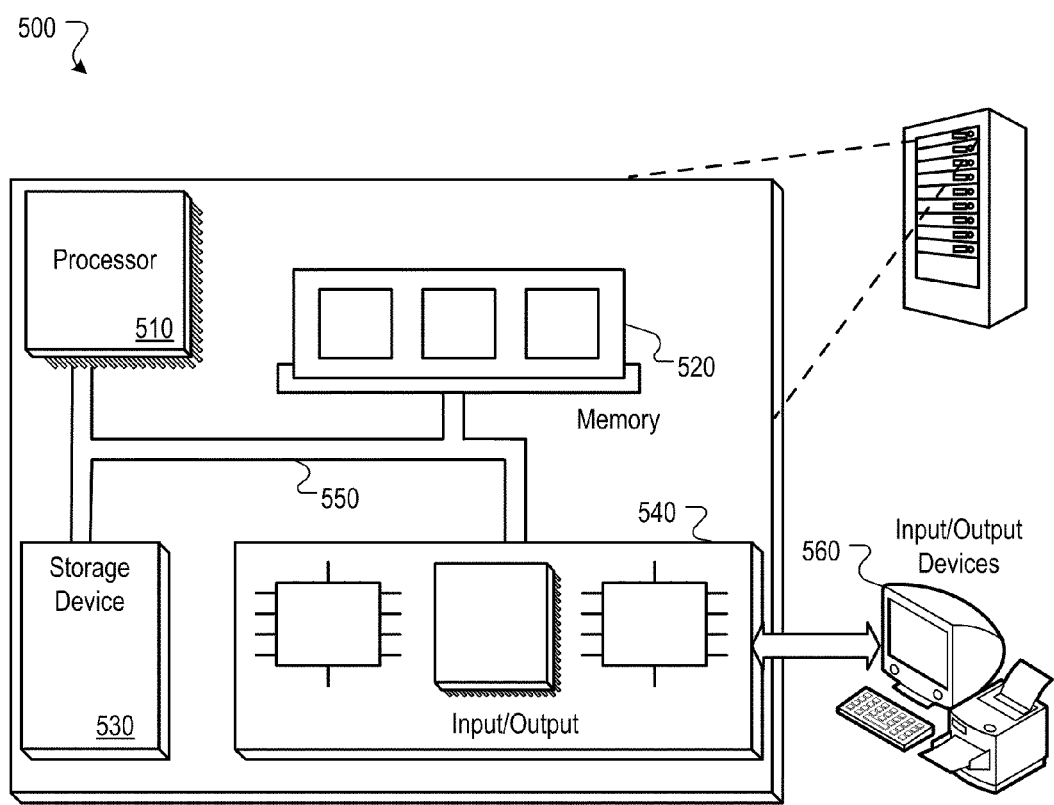
FIG. 4 is block diagram of an example computer system.

FIG. 4 is block diagram of an example computer system 500. The system 500 includes a processor 510, a memory 520, a storage device 530, and an input/output device 540. Each of the components 510, 520, 530, and 540 can, for example, be interconnected using a system bus 1350. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The advertising management system 104 and/or ad server 120, and components thereof, can be realized by instructions that upon execution cause one or more processing devices to carry out the processes and functions described above. Such instructions can, for example, comprise interpreted instructions, such as script instructions, e.g., JavaScript or ECMA-Script instructions, or executable code, or other instructions stored in a computer readable medium. The advertising management system 104 and/or ad server 120, and components thereof, can be distributively implemented over a network, such as a server farm, or can be implemented in a single computer device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer implemented method, comprising:
   determining a predicted performance metric for a candidate advertisement in a particular advertising slot, the predicted performance being an expected performance of the advertisement when presented in the particular advertising slot;
   selecting a control set of impressions for the candidate advertisement, the control set of impressions being only past impressions of the candidate advertisement that resulted in both a click of the candidate advertisement and a post-click conversion;
   determining a baseline predicted performance metric for the candidate advertisement, the baseline predicted performance metric being determined based on the control set of impressions and specifying a predicted measure of performance of the advertisement for the control set of impressions;

comparing the predicted performance metric for the candidate advertisement when presented in the particular advertising slot to the baseline predicted performance metric for the candidate advertisement;

adjusting a target bid associated with the candidate advertisement based upon the comparison of the predicted performance metric for the candidate advertisement and the baseline predicted performance metric for the candidate advertisement; and submitting the adjusted target bid to an auction for the particular advertising slot.

2. The computer implemented method of claim 1, wherein the predicted performance metric is based upon historical conversion tracking data for the candidate advertisement when previously presented in advertising slots.

3. The computer implemented method of claim 2, wherein the predicted performance metric is further based upon historical conversion tracking data for the candidate advertisement when previously presented in advertising slots having characteristics similar to the particular advertising slot.

4. The computer implemented method of claim 1, wherein determining the baseline predicted performance metric comprises:

receiving predicted conversion rates for a set of previous auctions associated with the control set of impressions for the candidate advertisement;

determining an average predicted conversion rate for the candidate advertisement for the set of previous auctions, the average predicted conversion rate being an average of the predicted conversion rates for the set of previous auctions; and selecting, as the baseline predicted performance metric, the average predicted conversion rate for the candidate advertisement.

5. The computer implemented method of claim 1, wherein:

comparing the predicted performance metric of the candidate advertisement to the baseline predicted performance metric for the candidate advertisement comprises dividing the predicted performance metric by the baseline predicted performance metric to derive an adjustment ratio; and adjusting the target bid comprises multiplying the target bid by the adjustment ratio.

6. The computer implemented method of claim 1, further comprising:

determining an average price paid for each impression of the advertisement; and determining that the average price paid exceeds the target bid;

in response to determining that the average price paid exceeds the target bid, throttling the adjusted bid.

7. The computer implemented method of claim 6, wherein throttling the adjusted bid comprises decreasing the adjusted bid to the target bid.

8. The computer implemented method of claim 6, wherein throttling the adjusted bid comprises decreasing the adjusted bid to a maximum adjusted bid.

9. The computer implemented method of claim 6, wherein throttling the adjusted bid comprises discounting the adjusted bid by a percentage based on how much the average price paid exceeds the target bid.

10. A computer-readable medium having instructions stored thereon, which, when executed by a processor, causes the processor to perform operations comprising:

determining a predicted conversion rate for a candidate advertisement when presented in a particular advertising slot, the predicted conversion rate being an expected conversion rate for the advertisement when the candidate advertisement is presented in the particular advertisement slot;

selecting a control set of impressions for the candidate advertisement, the control set of impressions being only past impressions of the advertisement that resulted in both a click and a conversion;

determining a baseline predicted conversion rate for the candidate advertisement, the baseline predicted conversion rate being determined based on the control set of impressions and specifying a predicted conversion rate of the candidate advertisement when awarded the control set of impressions;

comparing the predicted conversion rate for the candidate advertisement when presented in the particular advertising slot to the baseline predicted conversion rate;

adjusting a target bid associated with the advertisement based upon the comparison of the predicted conversion rate and the baseline predicted conversion rate; and submitting the adjusted target bid to an impending auction for the particular advertising slot.

11. The computer-readable medium of claim 10, wherein the predicted conversion rate is based upon historical conversion tracking data for the candidate advertisement when previously presented in advertising slots similar to the candidate advertising slot.

12. The computer-readable medium of claim 10, wherein determining the baseline predicted conversion rate comprises:

receiving predicted conversion rates for impressions in the control set of impressions;

determining an average predicted conversion rate for the control set of impressions, the average predicted conversion rate being a statistical average of the predicted conversion rates for the impressions in the control set of impressions; and selecting, as the baseline predicted conversion rate for the candidate advertisement, the average predicted conversion rate for the control set of impressions.

13. The computer-readable medium of claim 10, wherein comparing the predicted conversion rate to the baseline rate comprises dividing the predicted conversion rate by the baseline predicted conversion rate to derive an adjustment ratio, and wherein adjusting the target bid comprises multiplying the target bid by the adjustment ratio.

14. The computer-readable medium of claim 10, further comprises:

determining an average discount bid associated with the advertisement, wherein the average discount bid is an average amount paid by the advertiser for the advertisement;

comparing the average discount bid to the target bid; and if the average discount bid exceeds the target bid, throttling the adjusted bid.

15. A computer implemented method, comprising:

determining a predicted conversion rate for a candidate advertisement when presented in a particular available advertising slot, the predicted conversion rate being an expected conversion rate for the advertisement when presented in the particular advertisement slot;

selecting a control set of impressions for the candidate advertisement, the control set of impressions being only the past impressions of the candidate advertisement that resulted in both a click of the candidate advertisement and a post-click conversion, each impression being a presentation of the candidate advertisement;

determining an average predicted conversion rate for the control set of impressions;

comparing the predicted conversion rate for the candidate advertisement when presented in the particular available advertising slot to the average predicted conversion rate;

adjusting a target impression based bid associated with the candidate advertisement based upon the comparison of the predicted conversion rate for the candidate advertisement and the average predicted conversion rate; and submitting the adjusted target impression based bid to an auction for the available particular advertising slot.

16. A computer implemented method, comprising:

determining a predicted revenue metric for a candidate advertisement when presented in a particular available advertising slot;

selecting a control set of impressions for the candidate advertisement, the control set of impressions being only past impressions of the candidate advertisement that resulted in both a click of the candidate advertisement and a post-click conversion;

determining an average predicted revenue metric for the control set of impressions, the average predicted revenue metric specifying an average predicted revenue generated by the candidate advertisement when awarded impressions in the control set of impressions;

comparing the predicted revenue metric for the candidate advertisement when presented in the particular available advertising slot to the average predicted revenue metric adjusting a target conversion based bid associated with the candidate advertisement, the adjustment being based upon the comparison of the predicted revenue metric for the candidate advertisement and the average predicted revenue metric; and submitting the adjusted target bid to an auction for the particular available advertising slot.

* * * * *